United States Patent
Wu et al.

(10) Patent No.: US 9,591,399 B1
(45) Date of Patent: Mar. 7, 2017

(54) AUTOMATICALLY CONTROLLED DIRECTIONAL SPEAKER, AND LAMP THEREOF

(71) Applicant: UNITY OPTO TECHNOLOGY CO., LTD., New Taipei (TW)

(72) Inventors: Ching-Huei Wu, New Taipei (TW); Kai-Cheng Chuang, New Taipei (TW)

(73) Assignee: Unity Opto Technology Co., Ltd., New Taipei (TW)

( * ) Notice: Subject to any disclaimer, the term of this patent is extended or adjusted under 35 U.S.C. 154(b) by 0 days.

(21) Appl. No.: 14/885,046

(22) Filed: Oct. 16, 2015

(30) Foreign Application Priority Data

Aug. 14, 2015 (TW) .............................. 104126511 A (51) Int. Cl.
| | |
|---|---|
| *H03G 3/00* | (2006.01) |
| *H04R 1/34* | (2006.01) |
| *H04N 5/225* | (2006.01) |
| *G06K 9/00* | (2006.01) |
| *H04N 5/232* | (2006.01) |

(52) U.S. Cl.
CPC ......... *H04R 1/345* (2013.01); *G06K 9/00228* (2013.01); *G06K 9/00268* (2013.01); *H04N 5/2256* (2013.01); *H04N 5/23238* (2013.01); *H04R 2201/025* (2013.01); *H04R 2430/01* (2013.01)

(58) Field of Classification Search
USPC ........................................................ 381/387
See application file for complete search history.

(56) References Cited

U.S. PATENT DOCUMENTS

| | | | | |
|---|---|---|---|---|
| 5,367,576 A | * | 11/1994 | Matsumoto | H04R 1/30 181/152 |
| 6,160,896 A | * | 12/2000 | Macaluso | H04M 1/19 381/386 |
| 2006/0104488 A1 | * | 5/2006 | Bazakos | G06K 9/00255 382/118 |
| 2010/0061586 A1 | * | 3/2010 | Jain | F16M 11/08 382/100 |
| 2013/0265226 A1 | * | 10/2013 | Park | G06F 3/017 345/156 |
| 2013/0342669 A1 | * | 12/2013 | Hsu | H04N 7/002 348/77 |

* cited by examiner

*Primary Examiner* — Amir Etesam
(74) *Attorney, Agent, or Firm* — Rosenberg, Klein & Lee (57) ABSTRACT

An automatically controlled directional speaker includes a sound amplifying device, an image capture device, a computing device, an azimuth control motor and an amplitude control unit. The image capture device is provided for detecting the status of surrounding environment to generate image information, and the computing device is communicatively coupled to the image capture device for determining whether there is at least one face information in the image information, and the azimuth control motor is coupled to the sound amplifying device for controlling the azimuth of an output sound of the sound amplifying device according to the face information, and the amplitude control unit is communicatively coupled to the sound amplifying device for controlling the volume of the output sound of the sound amplifying device according to the face information. The speaker may be combined with a lamp to form an LED lamp with broadcasting and illumination functions.

9 Claims, 8 Drawing Sheets

AUTOMATICALLY CONTROLLED DIRECTIONAL SPEAKER, AND LAMP THEREOF

TECHNICAL FIELD

The technical field relates to a broadcasting apparatus, and more particularly to An automatically controlled directional speaker and capable of automatically performing face recognition to broadcast a sound to a designated person and combining with a lamp to improve the convenience of living.

BACKGROUND

Sound amplifying device is a widely and commonly used device capable of converting current frequency into sound to play various types of audio files. Sound amplifying devices may be combined and assembled to form a playing device such as a sound box.

The sound field of the sound amplifying device is limited by its placing position. In other words, a user may hear a sound coming from the sound amplifying device clearly only within a certain range. Our sense of sound depends on an analysis result processed by auditory sense of our brain, so that we can determine and feel the elements such as the direction, distance, and volume of a sound. For example, if a user wants to listen to a stereo or a radio indoors, the sound heard by the user will vary when the user is moving, since sound amplifying device is placed at a fixed position. If the user moves away from the sound amplifying device, the sound heard by the user will gradually become lower and more unclearly due to the factors of an increased distance or an deviated angle. To sense the sound in a full range, it is necessary to install a plurality of sound amplifying devices at different positions of a room or buy an expensive sound amplifying device with a stereo surround sound effect. Either way incurs a high setup cost.

When many people are in the room, the sound played by the sound amplifying device may affect other people, since the sound field range of the sound amplifying device cannot be controlled or the sound cannot be listed by just the designated person only. Therefore, the conventional sound amplifying device fails to satisfy the user requirement and the effect of playing sound to a designated person situated in an environment with many people or a public place. To solve the aforementioned problem, a manual remote control may be used to control the broadcasting direction of the sound amplifying device, but this method requires users to keep controlling the sound amplifying device manually according to the moving status of a listening target, and the method of controlling the direction of the sound amplifying device just achieves the effect of hearing the sound from a listening target and cannot adjust the sound effect of the listening target. In addition, if other people are near the listening target, these people will be affected. Obviously, the aforementioned method is not a good solution.

Besides the sound amplifying device, lamp is also a necessary electric/electronic device. From incandescent lamps at early stage to LED lamps extensively used at present, various types of lamps are installed indoor and outdoor for illumination, and the lamps are connected to mains power to obtain the startup power, and a control circuit is generally provided for adjusting the light emission of the lamps. Although both sound amplifying device and lamp are electronic devices, they are usually installed separately, and their space occupying percentage is increased accordingly, so that the using space available for users is decreased.

As science and technology advance rapidly, users have increasingly higher demand for the quality of life, so that the discloser of this disclosure further improves the performance and practicality of the sound amplifying device and reduces the occupied space while providing users a more convenient design of an automatically controlled directional speaker and its lamp, in hope of overcoming the aforementioned drawbacks of the prior art.

SUMMARY

Therefore, it is an objective of this disclosure to provide an automatically controlled directional speaker that is capable of detecting and identifying whether or not there is any person in the surrounding environment and automatically guiding and broadcasting sounds towards a designated person.

Another objective of this disclosure is to provide an LED lamp combined with the aforementioned automatically controlled directional speaker, so that the LED lamp has the effects of playing sound in a direction towards a designated person automatically and providing illumination at the same time.

To achieve the aforementioned and other objectives, this disclosure provides an automatically controlled directional speaker, and the speaker comprises: a sound amplifying device; an image capture device, for real time detecting the status of surrounding environment to generate at least one image information; a computing device, communicatively coupled to the image capture device, for determining whether or not the image information includes at least one face information; an azimuth control motor, coupled to the sound amplifying device, for controlling the sound amplifying device to output a sound azimuth according to the face information; and an amplitude control unit, communicatively coupled to the sound amplifying device, for controlling the volume of an output sound according to the face information. Preferably, the computing device performs an analysis by a fuzzy algorithm.

Wherein, the image capture device has an infrared focusing device or an ultrasonic focusing device, and the face information includes a relative face distance and a relative face azimuth; and the relative face distance and the relative face azimuth are determined by the infrared focusing device or the ultrasonic focusing device. Therefore, the relative distance and azimuth of a person with respect to the automatically controlled directional speaker can be determined to facilitate the sound amplifying device to broadcast more accurately.

In addition, the speaker of this disclosure further comprises an LED assist lamp installed adjacent to a side of the image capture device to provide sufficient brightness to surrounding environment and make the image information clearer.

To improve the image information of the image capture device in order to cover a wider visual range of an image, the image capture device includes a wide-angle camera lens, or the image capture device is mounted onto a pivot member provided for adjusting both shooting angle and range of the image capture device in top, bottom, left and right sides.

In addition, the speaker of this disclosure further comprises a movable waveguide structure installed at a sound output position of the sound amplifying device and having a sound input port, a sound output port, and a sound channel included between the sound input port and the sound output port; and the sound input port and the sound output port have adjustable relative aperture sizes respectively; wherein the relative diameter and size of the sound input port and the sound output port may be adjusted to further adjust the volume of the output sound of the sound amplifying device to provide a better listening effect.

In another preferred embodiment, this disclosure further discloses an LED illumination lamp of the automatically controlled directional speaker, characterized in that the whole LED lamp is a bulb lamp or a down light including the computing device installed therein and provided for performing an analysis by a fuzzy algorithm. The speaker of is disclosure may also be combined with a lamp, so that the lamp has both illumination and broadcasting functions, and such lamp can broadcast sound to a designated person automatically.

The speaker of this disclosure has the effects of detecting and determining whether or not there are other people in the surrounding environment, and automatically adjusting the output sound to a designated person or area, so that a user can listen to the sound very well even when the user is in a moving status. The speaker may be set to allow a designated person to listen to the sound, so as to prevent the sound from affecting other people. In addition, the speaker of this disclosure may be combined with a lamp to form an LED illumination lamp and provide both illumination and broadcasting effects. With an automatic face detection function, the LED illumination lamp can broadcast sounds towards a designated person and improve the convenience of use.

DESCRIPTION OF THE PREFERRED EMBODIMENTS

The technical content of this disclosure will become apparent with the detailed description of preferred embodiments and the illustration of related drawings as follows.

With reference to FIGS. 1, 2, 3, 4A and 4B for a schematic block diagram, a perspective view, and first to third schematic views of applications of an automatically controlled directional speaker 1 in accordance with the first preferred embodiment of this disclosure respectively, the automatically controlled directional speaker 1 comprises a sound amplifying device 10, an image capture device 11, a computing device 12, an azimuth control motor 13 and an amplitude control unit 14.

Figure 1:
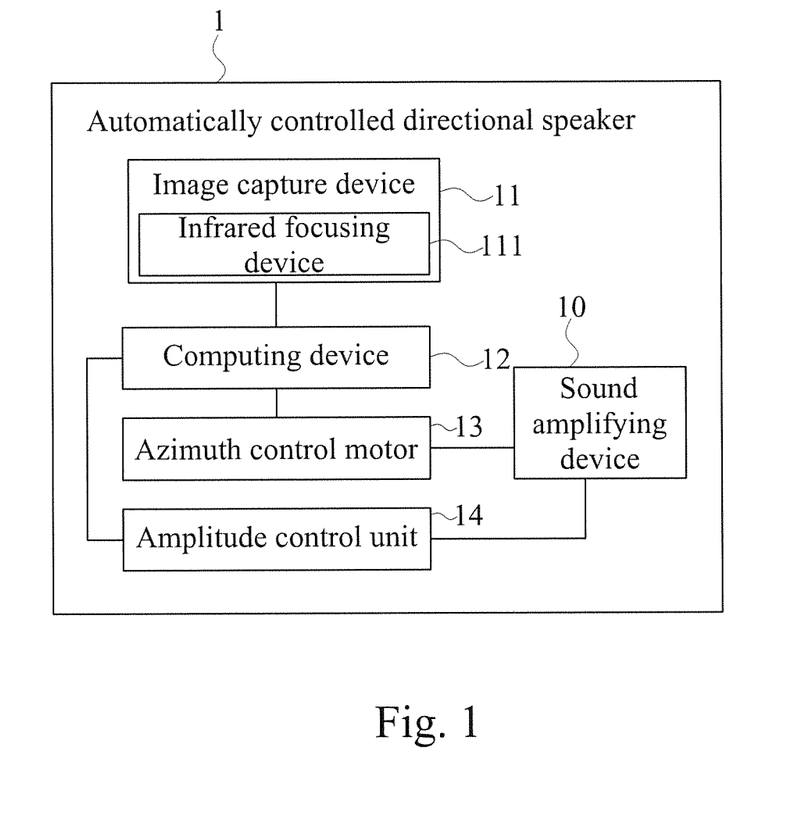
FIG. 1 is a schematic block diagram of a first preferred embodiment of this disclosure.
Figure 2:
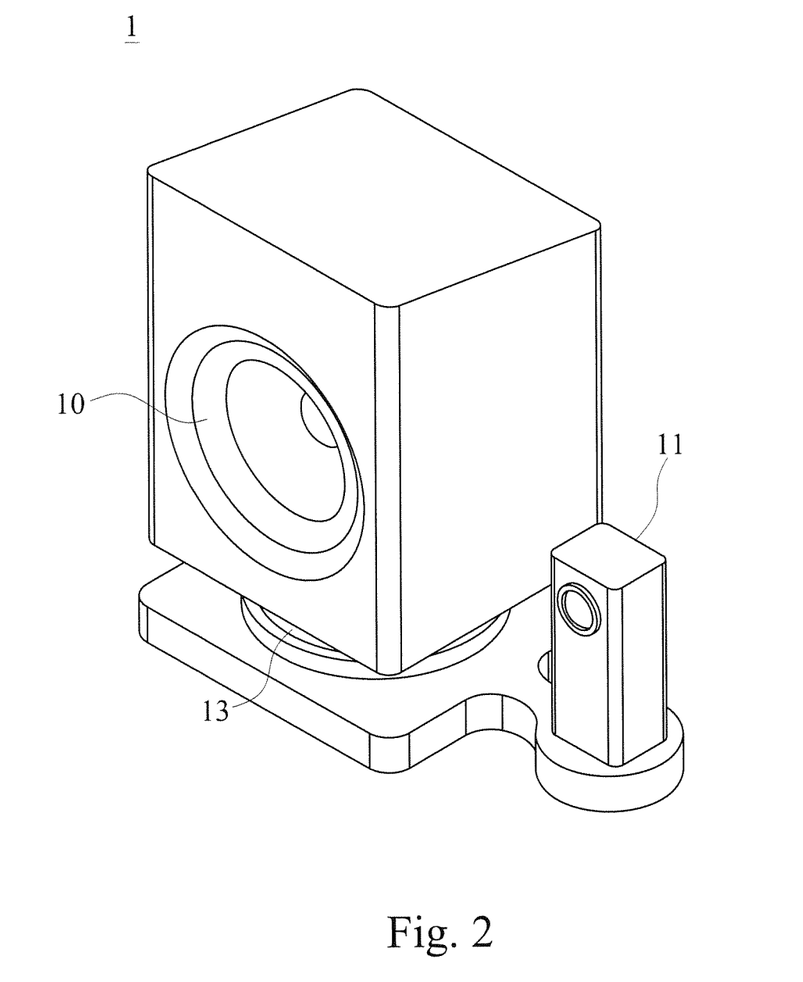
FIG. 2 is a perspective view of the first preferred embodiment of this disclosure.

The image capture device 11 is provided for real time detecting the status of surrounding environment to generate at least one image information, and the computing device 12 is communicatively coupled to the image capture device 11 for determining whether or not there is at least one face information in the image information generated by the image capture device 11. Preferably, the image capture device 11 has an infrared focusing device 111 or an ultrasonic focusing device, wherein the principle of infrared light or ultrasound is used to detect the status of an environment and obtain the image information. The face information further includes a relative face distance and a relative face azimuth, and the relative face distance and the relative face azimuth are determined by the infrared focusing device 111 or the ultrasonic focusing device. In this embodiment, the image capture device 11 having the infrared focusing device 111 is used for demonstration.

The azimuth control motor 13 is coupled to the sound amplifying device 10 for controlling the azimuth of an output sound of the sound amplifying device 10 according to the relative face azimuth in the face information. The amplitude control unit 14 is communicatively coupled to the sound amplifying device 10 for controlling the volume of the output sound of the sound amplifying device 10 according to the relative face distance in the face information. Therefore, the automatically controlled directional speaker 1 in accordance with this disclosure detects the surrounding environment by the image capture device 11, and then the computing device 12 analyzes the detected image information to determine whether or not the face information exists. If there is any face information, the relative face azimuth and the relative face distance will be calculated, so that the azimuth control motor 13 and the amplitude control unit 14 can control the sound amplifying device 10 to be aligned precisely at the position of that person to play sounds and adjust the distance between that person and the sound amplifying device 10 to adjust the volume of the output sound. To broaden the range of viewed images in the detection of the image information by the image capture device 11, the image capture device 11 includes a wide-angle camera lens for providing an accurate detection of the image information in a wide space.

In this disclosure as described above, the image capture device 11 captures the image information, and the computing device 12 analyzes the image information to determine whether or not the face information is included. In short, face detection is used for determining whether or not a face exists in an image by a characteristic capture method and providing information such as the face position and quantity. The face detection is mainly divided into two major computing methods. One of the two computing methods is based on characteristic and the other one is based learning. The characteristic based method is subdivided into the following methods. (1) Knowledge conditions constituting a typical face are used for coding, and face characteristics are localized. Geometric properties of a face figure are used for face region labeling. For example, an oval shape is used as a basis for determining a face figure. In other words, an edge detection method is used to capture an oval region in an image and the oval region is further analyzed to determine whether it is a face. (2) Face characteristics such as the structural organization of a face, skin color, face symmetry and distribution of face characteristic positions are used as a basis for determining and writing an algorithm. (3) A template matching method is used to compare an input image with a plurality of existing face samples and calculate the correlation between the image and the face samples to determine whether or not there is a face image in the image. Such template matching method is also uses face characteristics for the determination. Each of the characteristics above is not used individually, but the characteristics are combined and used in one or more methods to perform face detection. For instance, a skin color method used for detecting a face usually needs to combine the characteristics to improve the accuracy due to the interference by background.

In the learning based method, the distribution of a face is learned by neural network by capturing changes of the external appearance of the face of a large quantity of trained images to learn and modulate a plurality of models, and then comparing the whole image by a fixed range to locate the position of the face. Such method is relatively more difficult, since certain characteristics are not obvious, and the non-obvious characteristics may cause a failure of the detection.

For example, if skin color is used as an element for the determination of an image face detection, and the characteristics of a face figure is uses as an element for assisting the determination, this method analyzes the color information of the skin color of a face by using color division of an input image and processes the color information by a morphologic algorithm to locate an area that may have a face, and finally uses geometric shape of the image to identify and eliminate an area that may not be a face by the oval shape together with the aspect ratio of a face profile, so as to label a face position. The aforementioned method combines a plurality of algorithms and logical computation to determine the face position. To eliminate the influence of external environment factors such as the color information of an image that may be affected by a light color or the color deviation of an image capture equipment to result in a deviation of the overall image information and the ideal value, the computing logic may be adjusted as needed or other processing procedures may be supplemented. To improve the accuracy of interpretation, the technology of connected region may be used to further locate the position and region of a plurality of faces in an image. In summation of the description above, several algorithms and characteristics are used to locate and determine the face position and region in an image, and set up and eliminate the changing conditions of the algorithms to cope with the difference of a face due to light or angle.

In the setup of each of the aforementioned algorithms, the determination procedure of each algorithm provides accurate results. In short, such system is a system applying traditional set theory and algorithm. In the traditional set theory, the relation between a single element and a set is not a binary relation. As a single element to the degree of membership of a set is binary, the element is either equal to "0" or "1". Therefore, a face recognition system built by any of the aforementioned algorithms (including the algorithm of dividing an image, and the algorithm of using face characteristics for determination) provides binary results, such as "True" and "False", or "Yes" and "No".

The traditional set theory and its derived algorithms are called a fuzzy algorithm which belongs to the area of fuzzy set theory. In the fuzzy set theory, a characteristic function of the traditional set theory is selected from either "0" or "I", such that the membership function of the fuzzy set may be selected from any value from 0 to 1. In other words, an element of the fuzzy set may fall between 0 and 1 with respect to the degree of membership of this set, so that fuzzy set has infinite membership functions to cope with various different conditions and factors. Based on the algorithm of the fuzzy set, the relation between an element and a set is no longer binary, but a value of degree of membership is assigned according to the degree similar to element and set. In the computation of a large quantity of information or the classification of each element into a range which is a fuzzy and uncertain cluster, the fuzzy algorithm is a quick effective computing mechanism. The computing device 12 of this disclosure adopts a fuzzy algorithm to determine whether or not the image information captured by the image capture device 11 has the face information.

The computing device 12 of this disclosure analyzes the inputted image information to form a plurality of elements and applies the rule of thumb of human being to create each related fuzzy set and obtain a value of the degree of membership of each element with respect to the fuzzy sets, and then combines the values of the degree of membership to derive whether or not the face information is in the image information. Theoretically, a face is generally composed of an oval-like profile, facial features and skin color, so that after the computing device 12 receives the image information, the fuzzy algorithm analyzes the value of the degree of membership of each element of the image information with respect to the aforementioned face characteristics, so as to determine whether or not the face information is in the image information.

Figure 3:
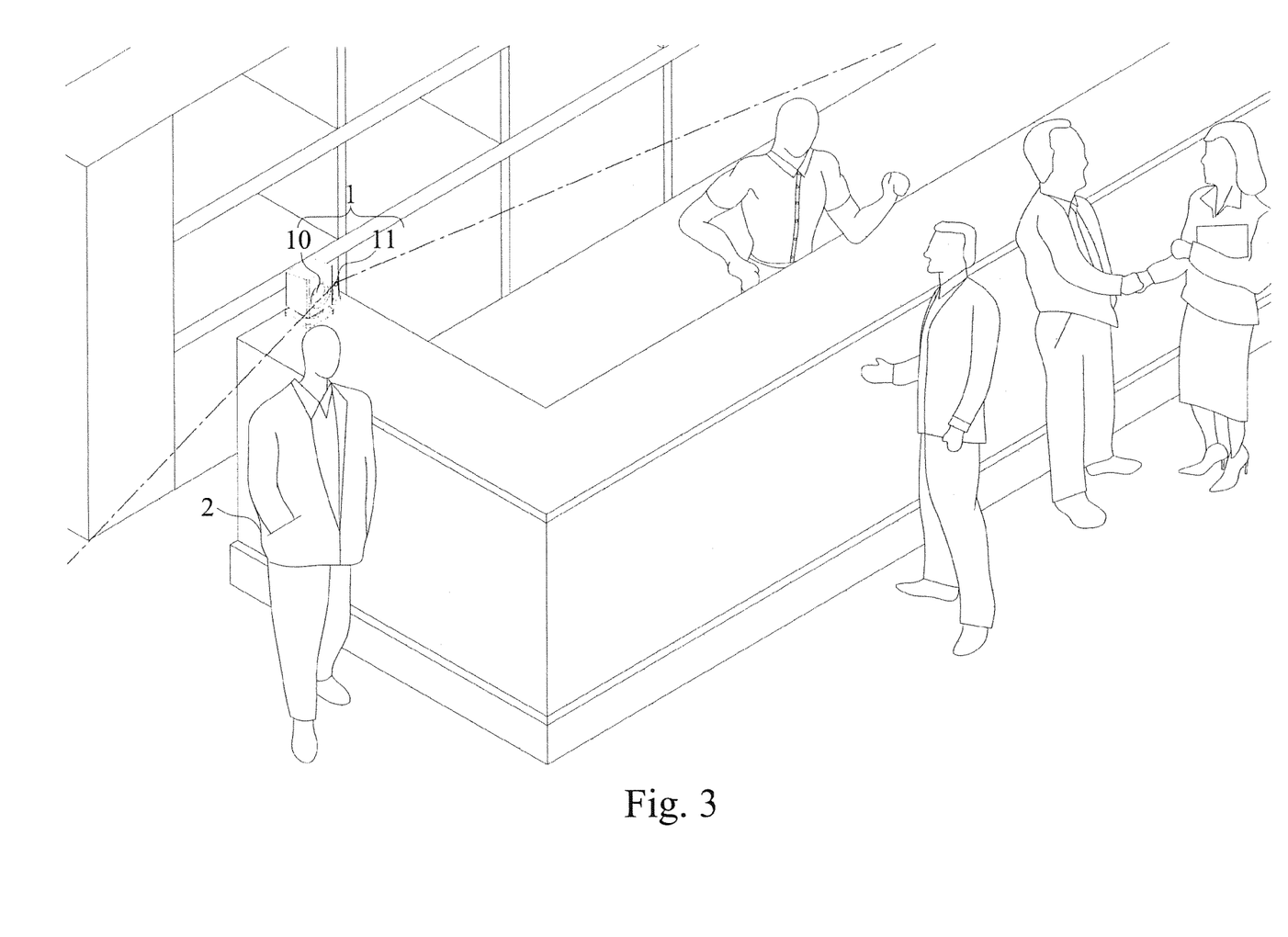
FIG. 3 is a first schematic view showing an application of the first preferred embodiment of this disclosure.
Figure 4A:
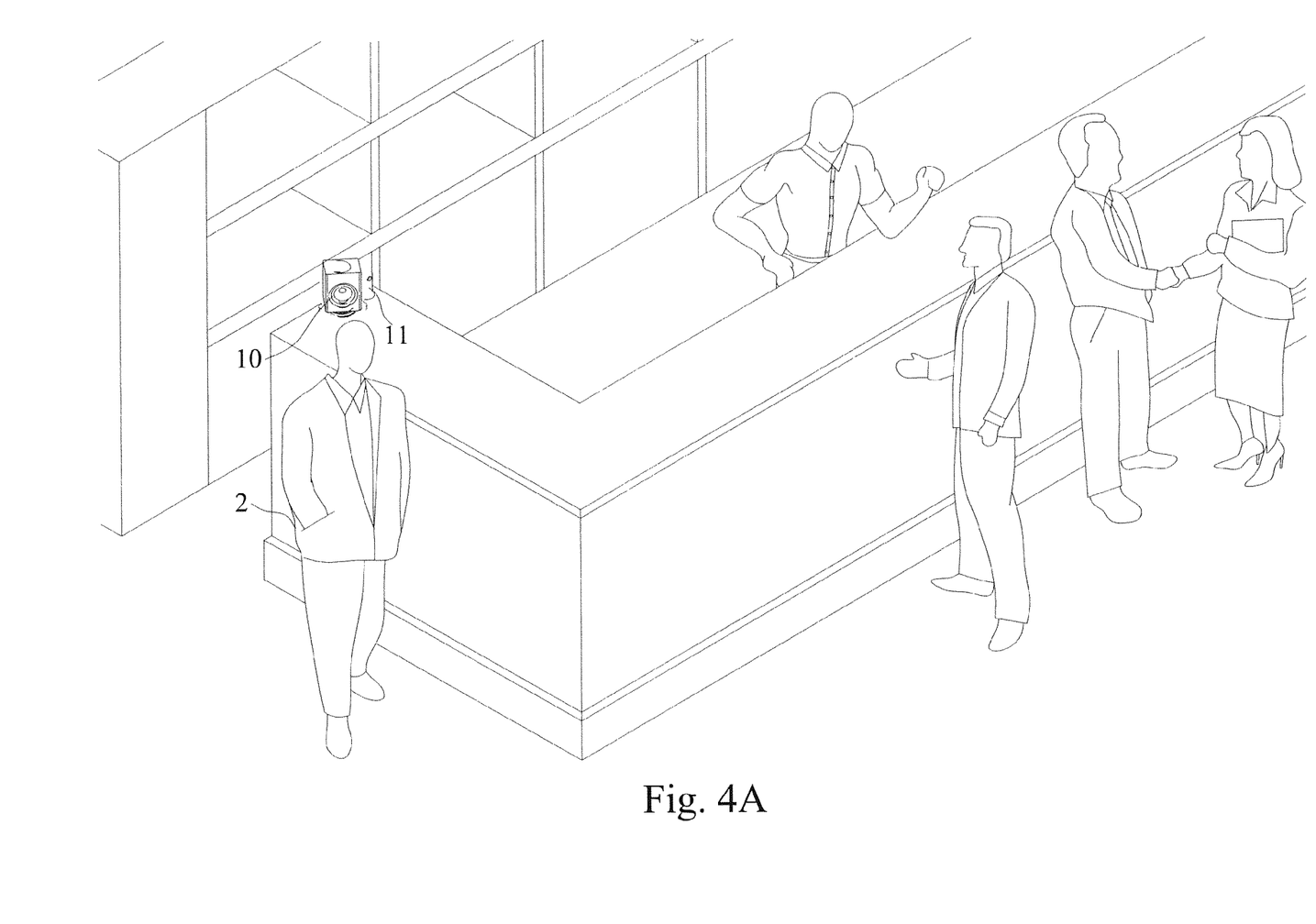
FIG. 4A is a second schematic view showing an application of the first preferred embodiment of this disclosure.

According to the differences of the installing space and environment of the automatically controlled directional speaker 1 and the desired broadcasting setup conditions, this disclosure may have various models due to the difference of the setup conditions to achieve the best broadcasting effect, and the general classification is based on distance, angle, azimuth and number of people, and each model executed corresponsive to the basis of each classification is described below. As to the factor of distance, if the automatically controlled directional speaker 1 comes with far, middle, and near broadcasting modes, a user may set the automatically controlled directional speaker 1 to broadcast to at least one listener 2 in a specific distance. Since the definition of a range of the far, middle, and near distance may not allow the automatically controlled directional speaker 1 to obtain the relative face distance, a quick determination of the range of the distance between a person and the image capture device 10 is made. Similarly, the fuzzy algorithm is used to derive that the face information falls within what distance range by the rule of thumb. In FIGS. 3 and 4A, the image capture device 11 automatically detects the surrounding environment to form the image information. After the computing device 12 analyzes the image information and confirms that the image information includes the face information (i.e. there is a person in the environment where the automatically controlled directional speaker 1 is situated, and then the infrared focusing device 111 or the ultrasonic focusing device determines the relative face distance and the relative face azimuth in the face information. If the selected mode of the automatically controlled directional speaker 1 is to broadcast to the listener 2 at a near distance, the fuzzy algorithm will determine a value of the degree of membership of the relative face distance corresponsive to the far, middle, near distance of each fuzzy set and will further determine whether or not the face information belongs to the listener 2 at a closer distance. If yes, then the sound amplifying device 10 will be driven to broadcast to the listener 2 according to the selected near-distance playing mode so as to provide the automatically controlled directional speaker 1 with a more diversified and accurate broadcasting effect. In addition, the automatically controlled directional speaker 1 may adjust the output amplitude and volume of the sound amplifying device 10 according to the distance mode by the amplitude control unit 14.

Similarly, the division of azimuth may be determined by the aforementioned method. If a simple and easy division is used, the azimuth control motor 13 may drives the sound amplifying device 10 to move in the up, down, left and right directions according to the face information. For a more accurate differentiation, the azimuth control motor 13 may be set to control the sound amplifying device 10 to move in the up, down, left and right directions, as well as the upper left, lower left, upper right and upper left directions. Since the definition of the aforementioned division of azimuth or angle is not clear, the azimuth control motor 13 may be unable to determine the relative face azimuth or determine the azimuth of the listener 2 by the infrared focusing device 111 or the ultrasonic focusing device. Similar to the determination of distance, the fuzzy algorithm is used to obtain the content of the relative face azimuth and the value of the degree of membership with respect to each azimuth and angle of the fuzzy set, so that the azimuth control motor 13 can drive the sound amplifying device 10 to be adjusted to a better position for broadcasting.

Figure 4B:
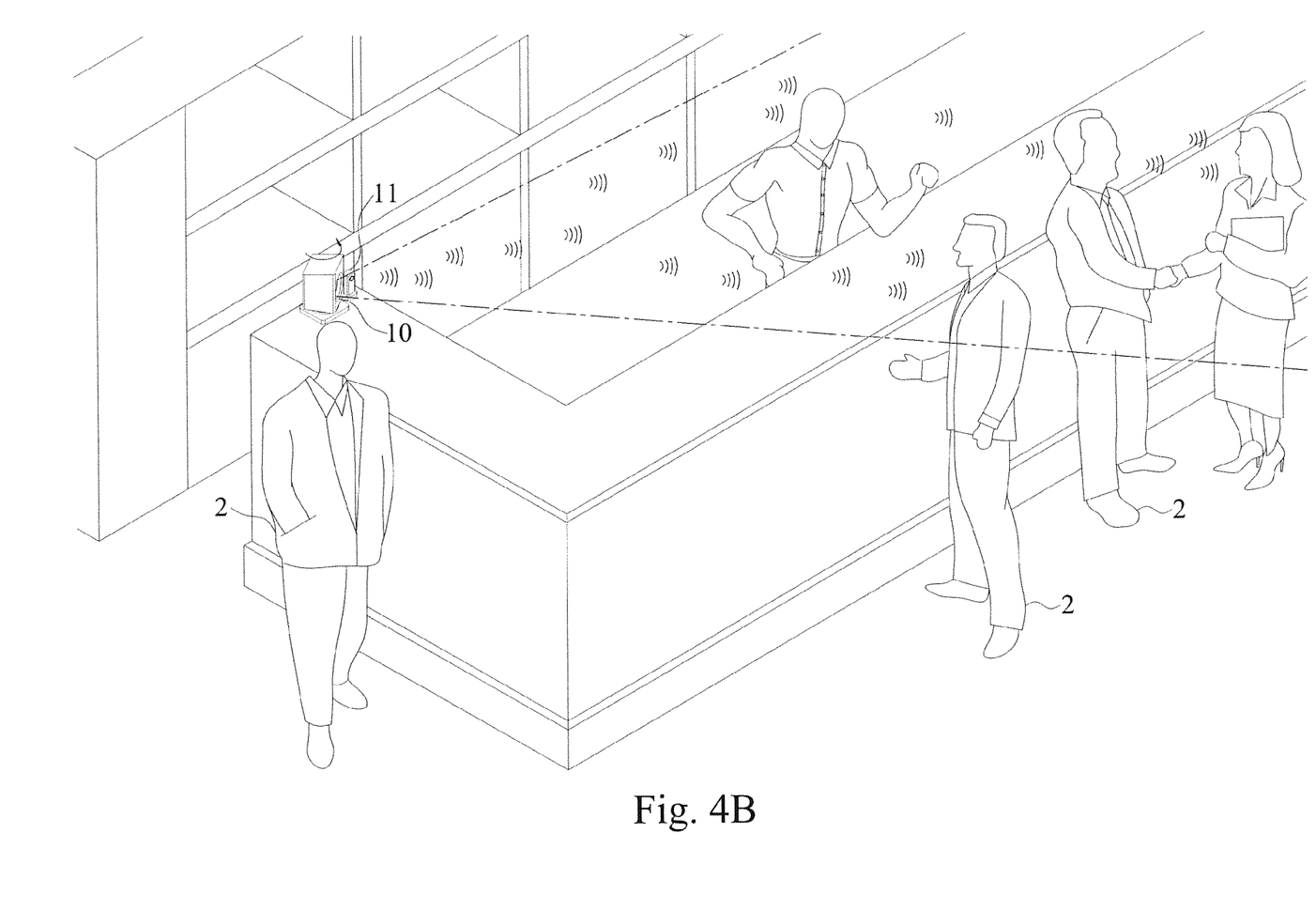
FIG. 4B is a third schematic view showing an application of the first preferred embodiment of this disclosure.

Since the automatically controlled directional speaker 1 may detect a plurality of face information in the environment or a plurality of people in the environment, the automatically controlled directional speaker 1 is designated to broadcast sounds towards a particular person according to the setup mode. For example, quantity is used as a basis for the setup, so that the automatically controlled directional speaker 1 may be set to broadcast sounds towards a place with more people or a place with less people. In FIG. 4B, if the computing device determines that there are many people in an environment and they are scattered, and the number of people at a place is greater than the number of people at another place, then the automatically controlled directional speaker 1 will automatically broadcast sounds towards the place with more people or the place with less people. In an example as shown in FIG. 4B, the automatically controlled directional speaker 1 broadcasts sounds towards an area with more listeners 2. In another situation, the computing device 12 determines that there are people in an environment and different relative face distances with respect to the automatically controlled directional speaker 1, the aforementioned distance determination method may be used together to achieve the effect of broadcasting to one or more listeners 2 at a specific distance.

Figure 5:
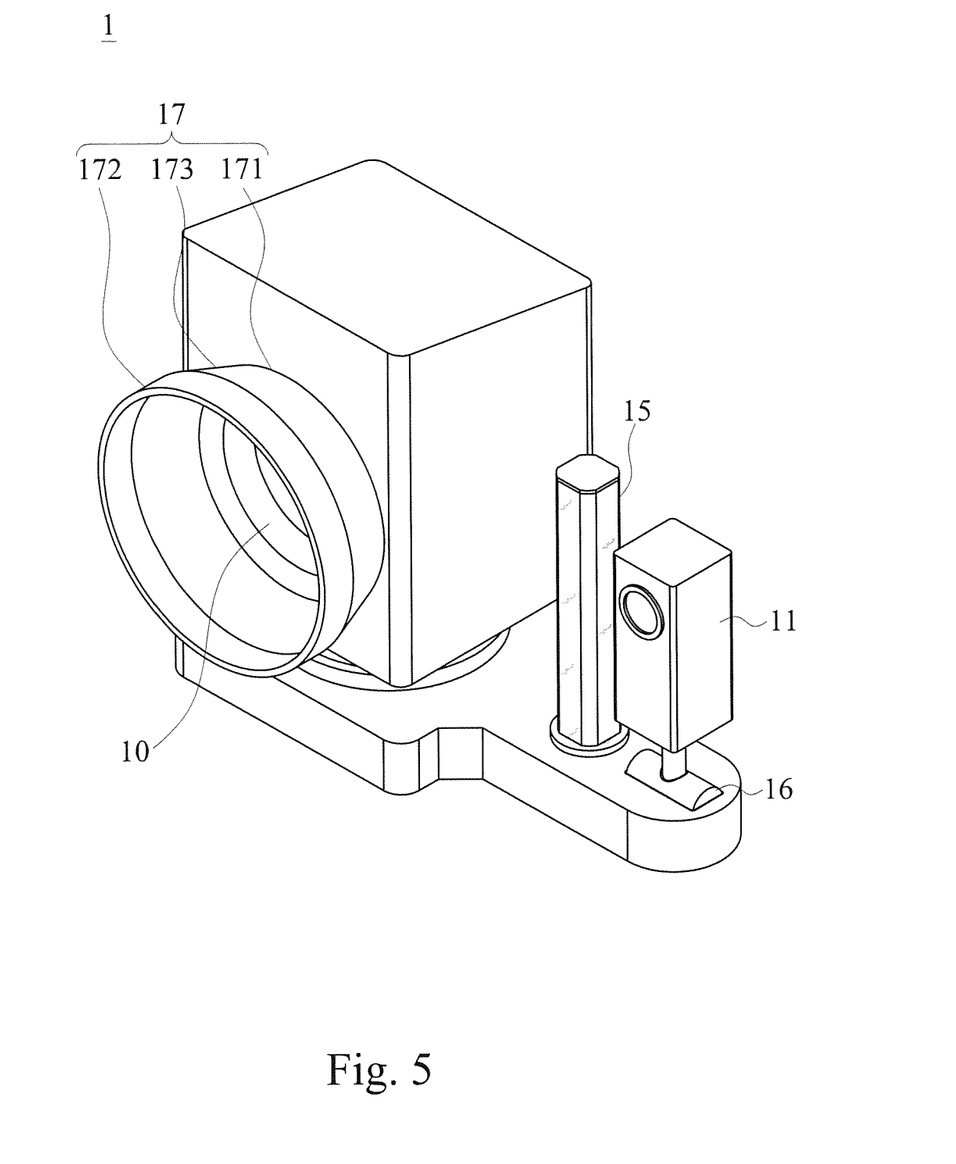
FIG. 5 is a perspective view of another implementation mode of the first preferred embodiment of this disclosure.

With reference to FIG. 5 for a perspective view of another implementation mode of this disclosure, the automatically controlled directional speaker 1 may be installed in a relatively darker environment. To avoid the situation of having insufficient light or low brightness to analyze and determine the contents of the image information, this disclosure further comprises an LED assist lamp 15 installed adjacent to a side of the image capture device 11 to provide sufficient light to the environment, so that the image information captured by the image capture device 11 has sufficient brightness and clarity. The image capture device 11 may be installed at a pivot member 16, and the pivot member 16 is provided for the image capture device 11 to adjusting the angle and range of shooting to up, down, left and right directions in order to enhance the shooting range of the image capture device 11 and provide a broader scope of the content of the image information.

Wherein, this disclosure further comprises a movable waveguide structure 17, installed at a sound output position of the sound amplifying device 10, and having a sound input port 171, a sound output port 172 and a sound channel 173 included between the sound input port and the sound output port. The relative diameter and size of the sound input port 171 and the sound output port 172 may be adjusted separately. Therefore, the output sound amplitude of the sound amplifying device can be adjusted according to the relative face distance by the amplitude control unit 14 first, and then the relative diameter and size of the sound input port 171 and the sound output port 172 are adjusted, and finally the amplitude and volume of the sound outputted from the sound amplifying device 10 are changed by the movable waveguide structure 17, so that the listeners can sense the sound better.

Figure 6:
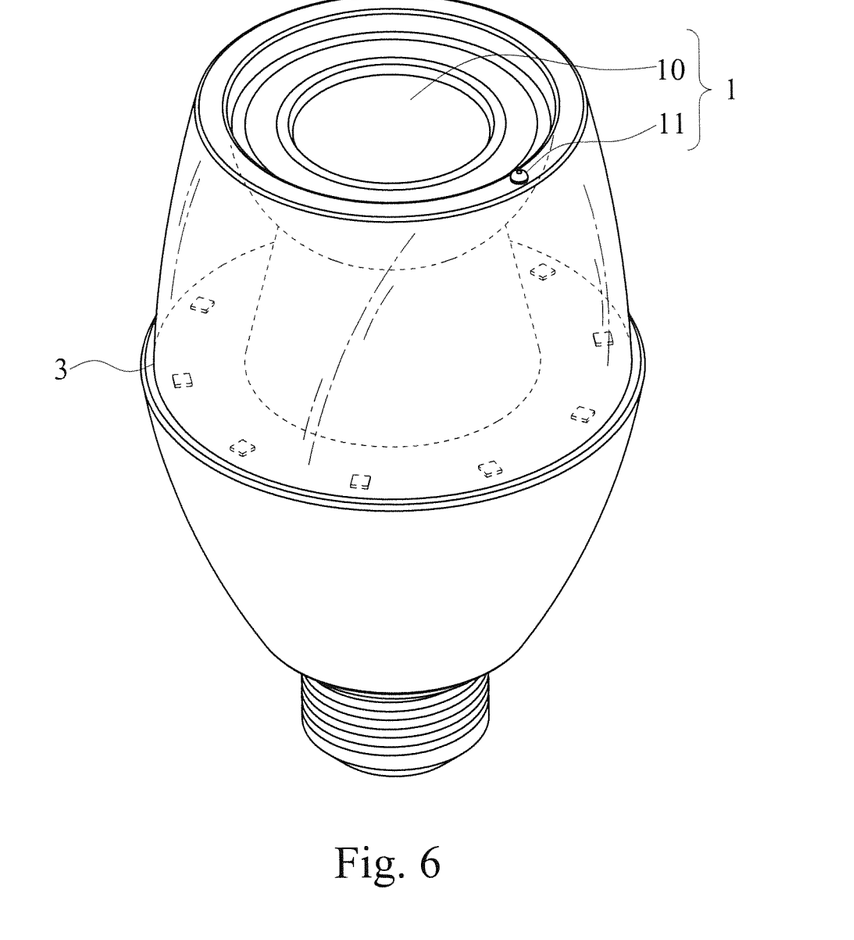
FIG. 6 is a schematic view of a second preferred embodiment of the present invention.

With reference to FIG. 6 for a perspective view of the second preferred embodiment of this disclosure, the elements and characteristics of this embodiment is substantially the same as those of the first preferred embodiment, and thus they will not be repeated. This preferred embodiment discloses an LED illumination lamp 3 having the aforementioned automatically controlled directional speaker 1 and characterized in that the LED illumination lamp 3 is a bulb lamp, so that the LED illumination lamp 3 can provide the illumination effect and the LED illumination lamp 3 uses the image capture device 11 to automatically detect the surrounding environment of the LED illumination lamp 3 to generate the image information, and further uses the computing device 12 to analyze whether or not there is the face information, or determine whether or not there are people in the environment, and then controls the azimuth, amplitude and volume of the output sound of the sound amplifying device 10 according to the face information, so that a designated person may hear the output sound of the sound amplifying device 10 and improve the practicality of the LED illumination lamp 3. As to the details of the automatically controlled directional speaker 1 of this preferred embodiment are similar to those of the first preferred embodiment, and thus they will not be repeated.

Figure 7:
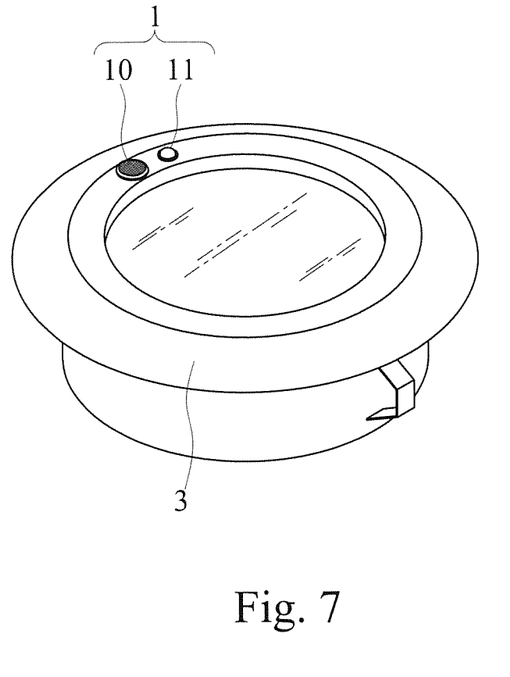
FIG. 7 is a perspective view of another implementation mode of the second preferred embodiment of this disclosure.

With reference to FIG. 7 for a perspective view of another implementation mode of the second preferred embodiment of this disclosure, the LED illumination lamp 3 of this implementation mode is a down light installed at an indoor ceiling, so that the automatically controlled directional speaker 1 can provide indoor lighting while using a face detection method to broadcast sounds towards a designated person automatically from the sound amplifying device 10 to improve the practicality of the LED illumination lamp 3.

In summation of the description above, the automatically controlled directional speaker of this disclosure determines whether or not there are any people in the surrounding environment by face detection, and automatically redirects and broadcasts sounds to an area where a person is there to achieve the broadcasting with automatically controlled directivity. The image capture device 11 detects and captures the surrounding environment to generate the image information, and then the computing device 12 performs the face recognition analysis to obtain the face information, while combining with the infrared focusing device 111 or the ultrasonic focusing device to determine the relative face distance and the relative face azimuth in the face information to facilitate controlling the sound output direction and the output amplitude and volume of the sound amplifying device 10. Therefore, this disclosure eliminates the inconvenience of the traditional speaker with regard to distance and broadcasting effect, so that users may have the best listening condition all the time. Meanwhile, this disclosure comes with various sound playing modes to cope with the installation environment or user requirements, and the automatically controlled directional speaker 1 can broadcast sound more accurately as needed. In addition, this disclosure may be integrated with a lamp for use, so that the LED illumination lamp 3 is capable of providing illumination and automatically searching a person in order to broadcast sound to such person and achieve the light and sound effects concurrently.

What is claimed is:

1. An automatically controlled directional speaker, comprising:

a sound amplifying device;

an image capture device, for real time detecting the status of surrounding environment to generate at least one image information;

a computing device, communicatively coupled to the image capture device, for determining whether or not the image information includes at least one face information;

an azimuth control motor, coupled to the sound amplifying device, for controlling the sound amplifying device to output a sound in a direction according to the face information;

an amplitude control unit, communicatively coupled to the sound amplifying device, for controlling the volume of an output sound according to the face information; and a movable waveguide structure for adjusting a amplitude of a output sound, installed at a sound output position of the sound amplifying device, and having a sound input port, a sound output port, and a sound channel included between the sound input port and the sound output port; and the sound input port and the sound output port having adjustable relative aperture sizes respectively, wherein the image capture device has an infrared focusing device or an ultrasonic focusing device, the face information includes a relative face distance and a relative face azimuth; and the relative face distance and the relative face azimuth are determined by the infrared focusing device or the ultrasonic focusing device.

2. The automatically controlled directional speaker according to claim 1, further comprising: an LED assist lamp, installed adjacent to a side of the image capture device.

3. The automatically controlled directional speaker according to claim 1, wherein the image capture device has a wide-angle camera lens.

4. The automatically controlled directional speaker according to claim 1, wherein the image capture device is installed on a pivot member which is provided for the image capture device to adjust both shooting angle and range in up, down, left and right directions.

5. The automatically controlled directional speaker according to claim 1, wherein the computing device performs an analysis by a fuzzy algorithm.

6. A light emitting diode (LED) lamp of the automatically controlled directional speaker according to claim 1, characterized in that the whole LED lamp is a bulb lamp.

7. The LED lamp according to claim 6, wherein the computing device performs an analysis by a fuzzy algorithm.

8. A light emitting diode (LED) lamp of the automatically controlled directional speaker according to claim 1, characterized in that the whole LED lamp is a down light.

9. The LED lamp according to claim 8, wherein the computing device performs an analysis by a fuzzy algorithm.

* * * * *